United States Patent [19]

Oka et al.

[11] Patent Number: 4,650,818

[45] Date of Patent: Mar. 17, 1987

[54] POLYOLEFINE COMPOSITIONS COMPRISING (A) MICA AND (B) A ETHYLENE-ACRYLIC ACID POLYMERIC COUPLING AGENT

[75] Inventors: Masataka Oka, Fujiswa; Masami Furukawa; Shinji Kojima, both of Yokohama; Takeo Amatsu, Kawasaki, all of Japan

[73] Assignee: Nippon Petrochemicals Co., Ltd., Japan

[21] Appl. No.: 746,645

[22] Filed: Jun. 20, 1985

[30] Foreign Application Priority Data

Jun. 25, 1984 [JP] Japan ................................ 59-130269

[51] Int. Cl.$^4$ .......................... C08K 3/34; C08K 9/04; C08K 9/12
[52] U.S. Cl. .................................. 523/205; 523/209; 524/423; 524/427; 524/449; 524/522
[58] Field of Search ...................... 524/449, 427, 423; 523/209, 205

[56] References Cited

U.S. PATENT DOCUMENTS

| | | | |
|---|---|---|---|
| 4,071,494 | 1/1978 | Gaylord | 523/205 |
| 4,091,164 | 5/1978 | Schwarz | 523/209 |
| 4,124,562 | 11/1978 | Yui et al. | 523/209 |

FOREIGN PATENT DOCUMENTS

| | | | |
|---|---|---|---|
| 3057295 | 5/1978 | Japan . | |
| 0096639 | 6/1983 | Japan | 523/205 |
| 0058458 | 4/1985 | Japan | 523/209 |

Primary Examiner—Herbert J. Lilling
Attorney, Agent, or Firm—Ostrolenk, Faber, Gerb & Soffen

[57] ABSTRACT

This invention provides inorganic filler-containing polyolefine compositions with use of inorganic fillers together with novel coupling agents which are inexpensive and convenient to use.

8 Claims, No Drawings

POLYOLEFINE COMPOSITIONS COMPRISING (A) MICA AND (B) A ETHYLENE-ACRYLIC ACID POLYMERIC COUPLING AGENT

BACKGROUND OF THE INVENTION (1) Field of the Invention

This invention relates to polyolefine compositions having improved mechanical properties which contain an inorganic filler and a novel coupling agent.

(2) Description of the Prior Art

It has been well known that certain mechanical properties of polyolefine composite materials containing an inorganic filler can be improved by treating the surface of the filler with a coupling agent. One representative class of coupling agents is organic silane compounds. However, organic silane coupling agents have some disadvantages such as being expensive in general, and inconvenient to use because they must be applied as an aqueous or alcoholic solution in surface treatment of the filler.

OBJECT OF THE INVENTION

This invention provides polyolefine compositions containing an inorganic filler and a novel coupling agent which is both inexpensive and convenient to use, unlike coupling agents currently in use.

DETAILED DESCRIPTION OF THE INVENTION

The compositions of this invention consist of the components explained as follows:

As an inorganic filler, a silicate, a carbonate or a sulfate, individually or as a mixture, is used in a ratio of 5–60 weight % of the total composition. Preferable fillers are silicates such as mica, talc, glass, calcium silicate or white clays, the most preferable one being mica, or powdery or fibrous glass.

The coupling agents include copolymers or terpolymers of ethylene with acrylic acid, methacrylic acid or their alkyl ester (alkyl group of 1–4 carbon atoms), having a viscosity average molecular weight of not more than 15,000 and containing acrylic acid or methacrylic acid in a ratio of not less than 1 mole %. The acrylic acid or methacrylic acid units in the co- or terpolymer can be in a form partially or wholly neutralized with an alkaline metal, an organic amine or ammonia. These copolymers or terpolymers and their neutralized forms can be prepared by known methods, and, particularly, terpolymers such as ethylene-ethyl acrylate-acrylic acid terpolymer can be prepared according to the method described in Japanese unexamined Patent Publication No. 53-57295, by thermal degradation of ethylene-ethyl acrylate copolymer of relatively higher molecular weight in an inert atmosphere in the presence of water or steam. Neutralized forms of these copolymers and terpolymers can be obtained by their neutralization and/or saponification with alkaline metal hydroxides or ammonium hydroxide, according to known methods.

As the coupling agent, these copolymers and terpolymers or their neutralized forms should preferably have a viscosity average molecular weight of not more than 15,000. Those having a viscosity average molecular weight over 15,000 act unsatisfactorily as the coupling agent, because of their relatively reduced number of functional groups. The content of acrylic acid or methacrylic acid in the coupling agent is preferably within a range of not less than 1 and not more than 15 mole %. A content of less than 1 mole % results in unsatisfactory coupling effect owing to a reduced number of functional groups, and a content over 15 mole %, on the other hand, is undesirable in that significant improvements in properties of the compositions are not achieved in spite of the increased cost of the coupling agent. A content within a range of 3–5% is most preferable in terms of favorable balance between effect and economy.

Coupling agents are used in a ratio of not less than 0.3, preferably 0.5, parts by weight to 100 part by weight of the filler and within a range not exceeding 2 weight % of the total composition. A ratio of less than 0.3 part by weight to 100 parts by weight of the filler results in unsatisfactory improvement in terms of tensile strength and rigidity of the composition due to insufficient coupling effect, whereas a content over 2 weight % of the total composition results in reduced rigidity, because the coupling agents are composed of a material of relatively low molecular weight.

The coupling agents of this invention like other surface treating agents, are ordinarily used in a form of an aqueous emulsion prepared with sodium hydroxide or ammonium hydroxide to treat the surface of fillers. They can also be added in a form of solid to polyolefine together with the filler and other additives and mixed with them. One of conspicuous advantages of this invention, thus, is to make it possible to omit the processes of preliminary surface treatment of the filler as a result of direct incorporation of solid coupling agents in polymer components.

Polyolefine components of the composition of this invention contain a modified polyolefine with a viscosity average molecular weight of not less than $2.6 \times 10^5$ in a ratio of not less than 3 weight % of the total polyolefine components, the modified polyolefine consisting of polyolefine modified by graft polymerization or copolymerization with an unsaturated carboxylic acid, or its anhydride or ester, such as ethylene-acrylic acid copolymer, ethylene-methacrylic acid copolymer, acrylic acid graft-modified polypropylene and maleic anhydride graft-modified polyethylene. The content of an unsaturated carboxylic acid or its derivatives combined in the modified polyolefine is required to be not less than 0.01 weight %, and a lower content results in unsatisfactory improvement in properties of the composition. Although the ratio of modified polyolefine is required to be not less than 3 weight % of the total polyolefine components, there is no particular upper limit up to 100% of them.

The polyolefine compositions of this invention have remarkably improved mechanical properties such as yield tensile strength flexural strength, flexusal modulus and heat distortion temperature, as compared with those containing the filler without a coupling agent. While the mechanism of this improvement has not yet been elucidated sufficiently, contribution of the coupling agent together with a modified polyolefine is clearly demonstrated in the experiments described below.

Detailed explanation of this invention is presented below, taking, as an example, compositions containing isotactic polypropylene and mica as main components.

Materials used were as follows:

1. Isotactic polypropylene

Polypropylene with melt flow index of 8 g/10 min. and viscosity average molecular weight of $8.5 \times 10^5$ (Nisseki Polypro J 650G of Nippon Petrochemicals Co., Ltd.).

2. Mica

Suzorite mica with weight average flake diameter of 90 μm, average aspect ratio of 50 and bulk density of 0.24 g/cc.

3. Coupling agent (A)

Ethylene-ethyl acrylate-acrylic acid terpolymer with viscosity average molecular weight of 5,200 and acrylic acid content of 3.6 mole %, obtained by by thermal degradation of ethylene-ethyl acrylate copolymer in an inert atmosphere in the presence of steam.

Coupling agent (B)

Partially neutralized ethylene-ethyl acrylate-acrylic acid terpolymer with viscosity average molecular weight of 4,700 and acrylic acid content of 3.1 mole % (Na neutralization degree of 60%), obtained by partial neutralization with sodium hydroxide of ethylene-ethyl acrylate-acrylic acid terpolymer prepared by the method mentioned above.

4. Modified polypropylene

Acrylic acid graft-modified polypropylene with melt flow index of 20 g/10 min., viscosity average molecular weight of $6.9 \times 10^5$ and acrylic acid content of 6 weight %.

Surface treatment of the mica with the coupling agent was carried out by the procedure mentioned below. Twenty parts by weight of the coupling agent (A) together with 0.92 parts by weight of sodium hydroxide were added to 80 parts by weight of water and the mixture was stirred under heating to prepare an aqueous emulsion. The emulsion thus obtained was added to mica under stirring at 730 rpm in a Henschel mixer by means of an injection syringe in a ratio of 0.7 part by weight of coupling agent (A) to 100 parts by weight of mica over 5 minutes, followed by stirring for another 5 minutes. After completion of stirring, the wet mass of mica was taken out of the mixer onto a shallow tray and spread as a uniformly thin layer, and dried in an oven over 3 hours at 130° C. After drying, lumps were crushed well and used.

EXAMPLE 1 AND REFERENCE EXPERIMENTS 1-3

In Example 1, the above-mentioned surface-treated mica, the above-mentioned modified polypropylene and the above-mentioned isotactic polypropylene, in Reference Experiments 1 and 2, the above-mentioned surface-untreated mica and the above-mentioned isotactic polypropylene, respectively without and with the above-mentioned modified polypropylene, and in Reference Experiment 3, the above-mentioned surface-treated mica and the above-mentioned isotactic polypropylene were employed, and the compositions obtained were subjected to measurement of physical properties such as yield tensile strength and others, the results being shown in Table 1.

TABLE 1

|  |  | Reference Experiment 1 | Reference Experiment 2 | Reference Experiment 3 | Example 1 |
|---|---|---|---|---|---|
| Components |  |  |  |  |  |
| Isotactic polypropylene | Weight % | 60 | 55 | 60 | 55 |
| Mica (with surface-treatment) | Weight % | — | — | 40 | 40 |
| Mica (without surface-treatment) | Weight % | 40 | 40 | — | — |
| Modified polypropylene | Weight % | — | 5 | — | 5 |
| Physical date |  |  |  |  |  |
| Yield tensile strength | Kg/cm$^2$ | 257 | 260 | 264 | 371 |
| Elongation at break | % | 10 | 10 | 10 | 10 |
| Flexural strength | Kg/cm$^2$ | 459 | 470 | 438 | 619 |
| Flexural modulus | Kg/cm$^2$ | 57,000 | 58,000 | 57,600 | 62,200 |
| Heat distortion temperature | °C. | 135 | 137 | 138 | 150 |

Note 1. Methods described below were followed in each measurment.
Yield tensile strength    ASTM D638-64T
Elongation at break       ASTM D638-64T
Flexural strength         ASTM D790-63
Flexural modulus          ASTM D790-63
Heat distortion temperature ASTM D746-64T (4.6 Kg)

Note 2. The ASTM type dumb-bells used were injection molded under the following conditions:
Mold temperature          50° C.
Molding temperature       250° C.
Injection pressure        1,000 Kg/cm$^2$

EXAMPLE 2

The above-mentioned surface-untreated mica, the above-mentioned modified polypropylene, the coupling agent (B) and the isotactic polypropylene were mixed at 720 rpm for 3 minutes in a Henschel mixer, and the composition obtained was subjected to measurement of physical properties such as yield tensile strength and others, the results being shown in Table 2.

TABLE 2

|  |  | Example 2 |
|---|---|---|
| Components |  |  |
| Isotactic polypropylene | Weight % | 55 |
| Mica | Weight % | 39.7 |
| Coupling agent (B) | Weight % | 0.28 |
| (Part by weight/100 parts by weight of untreated mica) |  | (0.7) |
| Modified polypropylene | Weight % | 5 |
| Physical date |  |  |
| Yield tensile strength | Kg/cm$^2$ | 350 |
| Elongation at break | % | 10 |
| Flexural strength | Kg/cm$^2$ | 594 |
| Flexural modulus | Kg/cm$^2$ | 62,000 |

TABLE 2-continued

| | | Example 2 |
|---|---|---|
| Heat distortion temperature | °C. | 150 |

Note.
The same test methods and the same conditions of injection molding the ASTM type dumb-bells as Example 1 were followed.

As clearly demonstrated by these Examples, this invention has made it possible to provide polyolefine compositions having improved mechanical properties without use of expensive materials and with simplified processes.

What is claimed is:

1. Polyolefine composition comprising:
   (a) mica in an amount of 5-60 weight % of the total composition;
   (b) a polymeric coupling agent consisting of ethylene-acrylic acid copolymer or ethylene-ethyl acrylate-acrylic acid terpolymer or their wholly or partially neutralized form with an acrylic acid content of not less than 1 mole % and a viscosity average molecular weight of not more than 8,000, in an amount of not less than 0.3 part by weight to 100 parts by weight of the mica and of not more than 2 weight % of the total composition; and
   (c) high molecular weight polyolefin which is a combination of isotactic polypropylene and acrylic acid graft modified polypropylene with a viscosity average molecular weight of not less than $2.6 \times 10^5$ and an acrylic acid content of not less than 0.01 weight %.

2. Polyolefine composition claimed in claim 1 in which the coupling agent has an acrylic acid content of not more than 15 mole % and in which the amount of coupling agent is from 0.3 part by weight to 100 parts by weight of the mica to 2 weight % of the total composition.

3. Polyolefine composition claimed in claim 2 in which the amount of coupling agent is at least 0.5 part by weight to 100 parts by weight of the mica.

4. Polyolefine composition claimed in claim 3 in which the acrylic acid content of the coupling agent is 3-5 mole %.

5. Polyolefine composition claimed in claim 1 in which the coupling agent is ethylene-ethyl acrylate-acrylic acid terpolymer.

6. Polyolefine composition claimed in claim 1 in which the coupling agent is partially neutralized ethylene-ethyl acrylate-acrylic acid terpolymer.

7. Polyolefine composition claimed in claim 1 in which the mica has been treated with the polymeric coupling agent before being added to the combination (c).

8. Polyolefine composition claimed in claim 1 in which the mica has not been treated with the polymeric coupling agent before being combined with said combination (c).

* * * * *